(12) United States Patent
Shibahara et al.

(10) Patent No.: US 7,250,209 B2
(45) Date of Patent: Jul. 31, 2007

(54) TRANSPARENT COMPOSITE COMPOSITION

(75) Inventors: Sumio Shibahara, Tokyo (JP); Yasuo Shimobe, Tokyo (JP); Hiromitsu Kuramoto, Tokyo (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 153 days.

(21) Appl. No.: 10/472,519

(22) PCT Filed: Jan. 22, 2003

(86) PCT No.: PCT/JP03/00502

§ 371 (c)(1),
(2), (4) Date: Sep. 24, 2003

(87) PCT Pub. No.: WO03/064535

PCT Pub. Date: Aug. 7, 2003

(65) Prior Publication Data

US 2004/0126592 A1    Jul. 1, 2004

(30) Foreign Application Priority Data

| Jan. 25, 2002 | (JP) | 2002-017702 |
| Jan. 25, 2002 | (JP) | 2002-017703 |
| Feb. 25, 2002 | (JP) | 2002-048042 |
| May 10, 2002 | (JP) | 2002-135299 |
| May 10, 2002 | (JP) | 2002-135342 |
| May 10, 2002 | (JP) | 2002-135714 |
| Sep. 19, 2002 | (JP) | 2002-273019 |

(51) Int. Cl.
*B32B 17/10* (2006.01)

(52) U.S. Cl. .............. 428/297.4; 428/441; 428/500; 428/300.1; 428/320.2; 428/325

(58) Field of Classification Search ........... 428/424.2, 428/297.4, 441, 500, 300.1, 320.2, 325; 524/492, 524/494, 553, 554
See application file for complete search history.

(56) References Cited

U.S. PATENT DOCUMENTS

| 4,599,373 | A | * | 7/1986 | Jones | 523/116 |
| 4,835,027 | A | * | 5/1989 | Sudo et al. | 428/65.1 |
| 5,424,339 | A | * | 6/1995 | Zanka et al. | 522/168 |
| 5,665,450 | A | * | 9/1997 | Day et al. | 428/114 |
| 5,733,659 | A | * | 3/1998 | Iwakiri et al. | 428/412 |
| 2005/0203239 | A1 | * | 9/2005 | Shibahara et al. | 524/494 |

FOREIGN PATENT DOCUMENTS

| GB | 994924 | * | 10/1963 |
| JP | 4-202308 A | | 7/1992 |
| JP | 9-95607 A | | 4/1997 |
| JP | 9-152510 A | | 6/1997 |
| JP | 11-507087 A | | 6/1999 |
| JP | 2000-7741 A | | 1/2000 |
| JP | 2000-63653 A | | 2/2000 |
| JP | 2000336011 A | * | 12/2000 |
| JP | 2001-261367 A | | 9/2001 |
| JP | 2002-241509 A | | 8/2002 |
| JP | 2002-356566 A | | 12/2002 |

OTHER PUBLICATIONS

Polymer Handbook, Brandup et al., 2nd Ed., 1975, pp. 111-158 and 111-159.*
Data from http://www.dynaroll.com/catalog/pag030.htm retrieved on May 12, 2005.*
Claims. copending U.S. Appl. No. 10/472,517.*

* cited by examiner

*Primary Examiner*—David W. Wu
*Assistant Examiner*—Satya Sastri
(74) *Attorney, Agent, or Firm*—Birch, Stewart, Kolasch & Birch, LLP

(57) ABSTRACT

A transparent composite composition is provided which is low in coefficient of linear expansion and excellent in transparency, heat resistance and solvent resistance and can serve as an optical sheet for a liquid crystal display device or organic EL display device, for instance and can thus serve as a glass substitute. The transparent composite composition has a transparent resin (a) and a glass filler (b), and the transparent resin (a) is a copolymer obtained from at least one reactive monomer lower in refractive index than the glass filler (b) and at least one reactive monomer higher in refractive index than the glass filler (b).

11 Claims, No Drawings

TRANSPARENT COMPOSITE COMPOSITION

This application is the national phase under 35 U.S.C. § 371 of PCT International Application No. PCT/JP03/00502 which has an International filing date of Jan. 22, 2003, which designated the United States of America.

TECHNICAL FIELD

The present invention relates to a transparent composite composition which is low in coefficient of linear expansion, is excellent in transparency, heat resistance and solvent resistance and can serve as a substitute for glass. This transparent composite composition can judiciously be used in producing liquid crystal display panel substrates, organic EL (electroluminescent) display device substrates, color filter substrates, touch panel substrates, solar cell substrates and like optical sheets, transparent sheets, optical lenses, optical devices, optical waveguides, LED (light-emitting diode) sealing materials, and so forth.

BACKGROUND ART

Those display panel or device substrates for use in active matrix type liquid crystal display devices and organic EL display devices, color filter substrates, solar cell substrates and the like which are made of glass are generally in wide use. In recent years, however, for the reasons that glass sheets are breakable, inflexible, and unsuited to weight reduction, various plastics materials have been investigated as substitutes therefor.

For example, Laid-open Japanese Patent Application (JP Kokai) H10-77321 describes that a member obtained by curing a resin composition comprising a noncrystalline thermoplastic resin and an actinic radiation-curable bis (meth)acrylate with an actinic ray can be used as a substitute for a glass substrate, such as a liquid crystal panel substrate. Further, JP Kokai H10-90667 describes a liquid crystal display device in which a transparent substrate obtained by curing/molding a composition comprising a specific alicyclic-structured or aromatic bis(meth)acrylate with an actinic radiation or the like is used.

However, these known plastics materials as substitutes for glass are all high in coefficient of linear expansion as compared with glass sheets and, when used as display device substrates, in particular active matrix display device substrates, they may cause such troubles as warping and aluminum wiring breaking in the production process and, accordingly, it is difficult to apply them to such fields of use. Thus, plastics materials satisfying the transparency, solvent resistance and heat resistance requirements, among others, imposed on display device substrates, in particular active matrix display device substrates and, at the same time, showing a small coefficient of linear expansion are demanded.

For reducing the coefficient of linear expansion, attempts have been made in the art to produce composite materials by incorporating an inorganic filler, such as a glass powder or glass fiber, in resins. In the case of such resin-inorganic filler composite materials, however, the transparency of the substrates is often impaired. The main cause is the difference in refractive index between the inorganic filler and resin, which causes diffused refraction of the light passing through the resin.

To solve such problems, various methods have been proposed, for example the method comprising adjusting the composition of a styrene-methacrylate copolymer to thereby equalize its refractive index with that of glass fiber, the method of refractive index adjustment which comprises blending an acrylic resin with a styrene-acrylonitrile copolymer and, further, the method of refractive index adjustment which comprises adjusting the composition of an N-substituted maleimide-olefin copolymer (e.g. JP Kokai S54-24993, Japanese Patent Publication (JP Kokoku) H06-94523, Japanese Patent No. 3216179). However, these materials are not sufficient in heat resistance and solvent resistance for their use as active matrix display device substrates in lieu of glass substrates.

It is an object of the present invention to provide a transparent composite composition low in coefficient of linear expansion, excellent in transparency, heat resistance and solvent resistance and capable of serving as a substitute for glass. The composite composition of the invention is suited for use in such fields of application as liquid crystal display device substrates, inclusive of active matrix type ones, organic EL display device substrates, color filter substrates, touch panel substrates, solar cell substrates and like optical sheets, transparent sheets, optical lenses, optical devices, optical waveguides, and LED sealing materials.

DISCLOSURE OF THE INVENTION

The present inventors made intensive investigations in an attempt to solve such problems. As a result, they found that a transparent composite composition comprising a glass filler (b) and a transparent resin (a) which is a copolymer obtained by crosslinking at least one reactive monomer lower in refractive index after crosslinking than the glass filler (b) and at least one reactive monomer higher in refractive index after crosslinking than the glass filler (b), with the difference in refractive index between (a) and (b) being not more than 0.01, is highly transparent, as evidenced by a light transmissivity at the wave-length 550 nm of not less than 80%, and, in addition, is low in coefficient of linear expansion and is excellent in heat resistance and solvent resistance as well. This and other findings have now led to completion of the present invention.

Thus, the present invention provides a transparent composite composition comprising a transparent resin (a) and a glass filler (b) and showing a light transmissivity at the wavelength 550 nm of not less than 80%.

Preferred as the transparent composite composition according to the invention is a resin composition comprising a transparent resin (a) obtained by crosslinking an acrylate (a1) having an alicyclic structure and at least one acrylate (a2) selected form among sulfur-containing acrylates and fluorene skeleton-containing acrylates and a glass filler (b).

DETAILED DESCRIPTION OF THE INVENTION

In the following, the present invention is described more specifically.

The transparent resin (a) to be used in the transparent composite composition of the invention is highly transparent to the visible light and, when it is molded into a sheet with a thickness of 200 μm, the light transmissivity thereof at the wavelength 550 nm is preferably not less than 80%, more preferably not less than 85%, most preferably not less than 90%. In the case of the production of display device substrates, in particular, the transmissivity should preferably be not less than 85%.

The transparent resin (a) preferably has a glass transition temperature of not lower than 150° C., more preferably not lower than 180° C., still more preferably not lower than 200° C. If the glass transition temperature of the resin is lower, deformation or warping will possibly occur in the step of TFT device formation in particular in the case of active matrix type display device substrates.

As examples of such transparent resin (a), there may be mentioned, among others, such thermoplastic resins as polycarbonates, polyarylates, polysulfones, polyethersulfones and cycloolefin polymers, and resins produced by crosslinking a reactive monomer(s) such as an acrylate(s) with actinic radiation. Among these, those resins resulting from crosslinking of a reactive monomer(s) such as an acrylate(s) with actinic radiation and/or by heating are preferred since they are excellent in solvent resistance.

Such reactive monomer may be any of those capable of crosslinking upon heating or exposure to actinic radiation. Preferred from the transparency and heat resistance viewpoint are (meth)acrylates having two or more functional groups. Those resins may be used singly or two or more of them may be used in combination.

When the transparent composite composition of the invention is used in producing plastics substrates for use as display device substrates, the light transmissivity thereof at the wave-length 550 nm is required to be not less than 80%, more preferably not less than 85%, most preferably not less than 88%. When the light transmissivity at the wavelength 550 nm is less than 80%, the display performance will be unsatisfactory.

For attaining a light transmissivity at the 550 nm of not less than 80% with such composite composition, either (1) the method comprising equalizing the refractive index of the transparent resin with that of the glass filler or (2) the method comprising using, as the glass filler, a fine one not larger than the wavelength of the light may be employed. In view of the ready material availability, however, the method involving refractive index adjustment is preferred.

For attaining better transparency, the difference in refractive index between the transparent resin (a) and glass filler (b) should be not more than 0.01, more preferably not more than 0.005. When such difference in refractive index is greater than 0.01, the resulting composite composition becomes poor in transparency.

The method employable for attaining a difference in refractive index between the transparent resin (a) and glass filler (b) of not more than 0.01 may comprise (1) selecting, as the glass filler (b), one matching in refractive index to the transparent resin (a), (2) selecting, as the transparent resin (a), one matching in refractive index to the glass filler (b), or (3) combinedly using a resin whose refractive index is higher than that of the glass filler (b) and a resin whose refractive index is lower than that of the glass filler (b) to thereby equalize the refractive index of the resin combination with that of the glass filler (b), for instance.

However, since resin species which when used singly, can match in refractive index to some or other glass filler are restricted, it is preferred that refractive index matching or adjustment be realized by combining two or more resins differing in refractive index or using two or more reactive monomers differing in refractive index after crosslinking. Since polymer species differing in refractive index and mutually compatible are also restricted, the refractive index is more preferably controlled by adjusting the proportion of two or more reactive monomers differing in refractive index and carrying out the polymerization. By such method, it is possible to adjust the refractive index of the resin to the refractive index of a glass filler in general use, such as E glass.

For adjusting the difference in refractive index between the resin and glass filler being not more than 0.01, the use of at least one reactive monomer higher in refractive index than the glass filler and at least one reactive monomer lower in refractive index than the glass filler is preferred.

(a1) Low Refractive Index Monomer

Usable as the reactive monomer lower in refractive index than the glass filler are various (meth)acrylates having an alicyclic structure or an aliphatic chain. From the transparency and heat resistance viewpoint, in particular, (meth)acrylates having an alicyclic structure are preferred. The alicyclic structure-containing (meth)acrylate to be used in preparing the composite composition of the invention may be any of those (meth)acrylates containing an alicyclic structure and having two or more functional groups. From the reactivity, heat resistance and transparency viewpoint, at least one (meth)acrylate selected from among the (meth)acrylates of the formulas (1) and (2) given below:

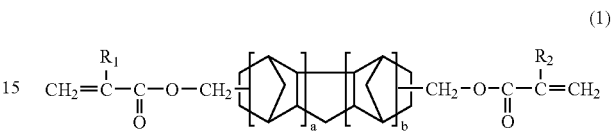

wherein $R_1$ and $R_2$ each independently represents a hydrogen atom or a methyl group, a represents 1 or 2 and b represents 0 or 1;

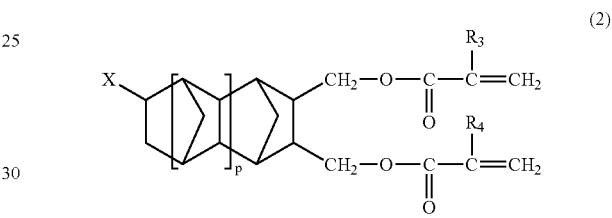

wherein X represents a hydrogen atom, —$CH_3$, —$CH_2OH$, $NH_2$, —$CH_2$—O—C(=O)—C($CH_3$)=$CH_2$ or —$CH_2$—O—C(=O)—CH=$CH_2$, $R_3$ and $R_4$ each independently represents H or —$CH_3$ and p is 0 or 1.

Among the (meth)acrylates of formula (1), dicyclopentadienyl diacrylate having a structure such that $R_1$ and $R_2$ each is a hydrogen atom, a is 1 and b is 0 is particularly preferred from the viewpoint of physical properties such as viscosity.

Among the (meth)acrylates of formula (2), at least one acrylate selected from among perhydro-1,4:5,8-dimethanonaphthalene-2,3,7-(oxymethyl)triacrylate having a structure such that X is —$CH_2OCOCH$=$CH_2$, $R_3$ and $R_4$ each is a hydrogen atom and p is 1 and the acrylate having a structure such that X, $R_3$ and $R_4$ each is a hydrogen atom and p is 0 or 1 is particularly preferred. From the viscosity viewpoint, among others, norbornane dimethylol diacrylate having a structure such that X, $R_3$ and $R_4$ each is a hydrogen atom and p is 0 is most preferred. The (meth)acrylates of formula (2) can be obtained by the method disclosed in JP Kokai H05-70523.

Desirable as the reactive monomer lower in refractive index than glass fibers from the transparency and heat resistance viewpoint are cyclic ether (meth)acrylates of the following formula (6):

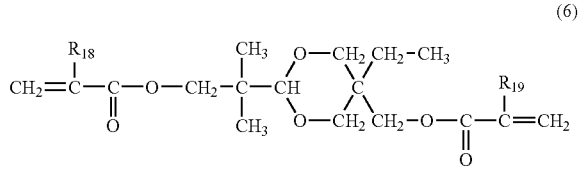

wherein $R_{18}$ and $R_{19}$ each independently represents a hydrogen atom or a methyl group.

(a2) Higher Refractive Index Monomer

Various sulfur- and/or aromatic ring-containing (meth)acrylates can be used as the reactive monomer higher in refractive index than glass fillers (glass fiber cloths), and sulfur-containing (meth)acrylates and fluorene skeleton-containing (meth)acrylates are preferred from the high refractive index viewpoint, in particular.

Sulfur-Containing (meth)acrylate

The sulfur-containing (meth)acrylate to be used in the practice of the invention may be any of sulfur-containing (meth)acrylates having two or more functional groups. From the heat resistance and transparency viewpoint, however, (meth)acrylates represented by the following formula (3) are preferred:

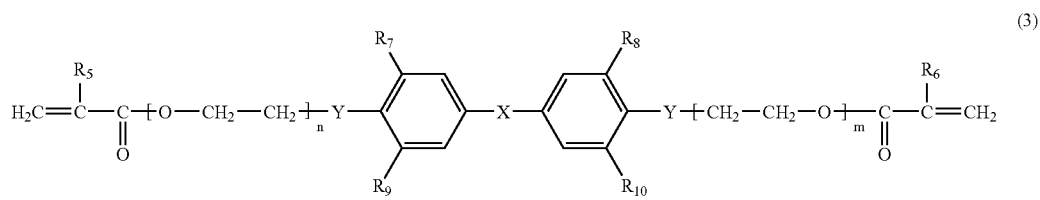

(3)

wherein X represents a sulfur atom or a $SO_2$ group, Y represents an oxygen or sulfur atom, $R_5$ to $R_{10}$ each independently represents a hydrogen atom or a methyl group, and n and m each is 0 to 2.

Among the (meth)acrylates of formula (3), bis[4-(acryloyloxyethoxy)phenyl]sulfide having a structure such that X is sulfur, Y is oxygen, $R_5$ to $R_{10}$ each is hydrogen and n and m each is 1 is most preferred from the reactivity, heat resistance and easy handling viewpoint.

Fluorene Skeleton-Containing (meth)acrylate

The fluorene skeleton-containing (meth)acrylate to be used in the practice of the invention is not particularly restricted but may be any of those fluorene skeleton-containing (meth)acrylates which have two or more functional groups. From the heat resistance and transparency viewpoint, however, at least one (meth)acrylate selected from the (meth)acrylates represented by the formula (4) and (5) given below is preferred:

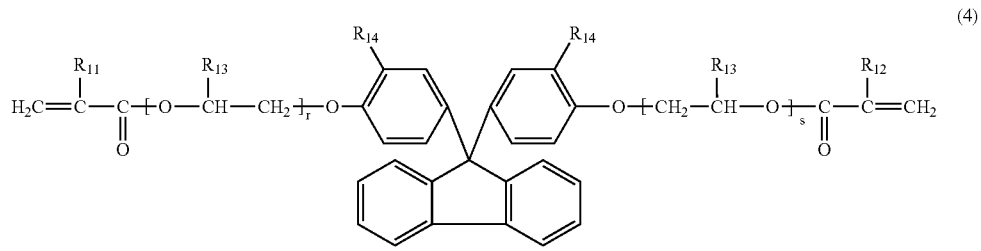

(4)

wherein $R_{11}$ to $R_{14}$ each independently represents a hydrogen atom or a methyl group and r and s each is 0 to 2;

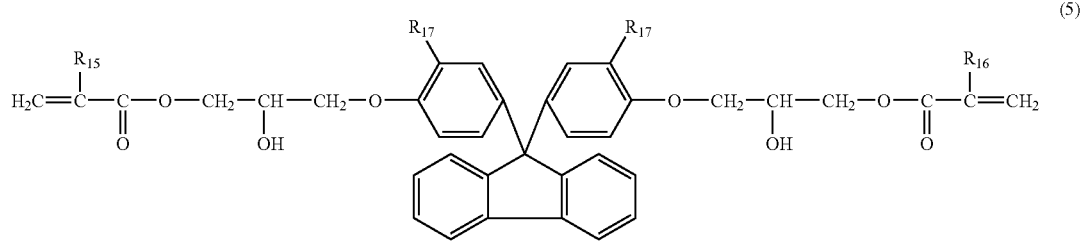

(5)

wherein $R_{15}$ to $R_{17}$ each independently represents a hydrogen atom or a methyl group.

Among these, bis[4-(acryloyloxyethoxy)phenyl]fluorene having a structure such that, in formula (4), $R_{11}$ to $R_{14}$ each is hydrogen and r and s each is 1 is most preferred.

These lower refractive index monomer and higher refractive index monomer can be mixed together in an appropriate proportion according to the desired refractive index and subjected to crosslinking so that the refractive index of the transparent resin may be matched with the refractive index of the glass filler to be combined therewith.

In the practice of the invention, a monofunctional (meth)acrylate may be used in combination with the (meth)acrylate having two or more functional groups for the purpose of providing flexibility, for instance, in an addition level range in which the desired characteristics will not be sacrificed. In this case, the monomer composition is adjusted so that the refractive index of the resulting whole resin component may match with the refractive index of the glass filler.

(b) Glass Filler

The refractive index of the glass filler (b) to be incorporated in the transparent composite composition of the invention is not particularly restricted but is preferably within the range of 1.50 to 1.57 so that the refractive index of the resin to be used in combination may be adjusted with ease. In particular when the refractive index of the glass filler is 1.50 to 1.54, it is favorably possible to select a resin close in Abbe number to the glass filler. When the resin and glass are close in Abbe number to each other, the refractive indexes of both agree in a wide wavelength range and a high light transmissivity can be obtained in the wide wavelength range.

The glass filler (b) to be used in the practice of the invention includes glass fibers, glass cloths, nonwoven glass fabrics and other glass fiber cloths, glass beads, glass flakes, glass powders, milled glass species and so forth. Among them, glass fibers, glass cloths and nonwoven glass fabrics are preferred in view of their being highly effective in reducing the coefficient of linear expansion. Glass cloths are most preferred.

As for the glass species, there may be mentioned E glass, C glass, A glass, S glass, D glass, NE glass, T glass, quartz, low inductivity glass, high inductivity glass and so forth. Preferred among them are E glass, S glass, T glass and NE glass, which are poor in ionic impurities such as alkali metals and readily available.

In cases where a glass cloth or nonwoven glass fabric is used as the glass filler, the manner of weaving of filaments is not restricted but includes plain weave, moss stitch-like weave, satin weave, and twill weave, among others. Plain weave is preferred, however. Generally, the glass cloth thickness is preferably 30 to 200 μm, more preferably 40 to 150 μm. The glass cloth, nonwoven glass fabric or other glass fiber fabric may be used either in the form of one single sheet or in the form of a laminate comprising a plurality of sheets.

(Transparent Composite Composition)

The content of the glass filler in the transparent composite composition is preferably 1 to 90% by weight, more preferably 10 to 80% by weight, still more preferably 30 to 70% by weight. When the glass filler content is lower, the composite composition will not show any substantial linear expansion coefficient reducing effect and, when it is higher, the appearance of the moldings tends to deteriorate.

The closer the contact between the glass filler, such as a glass fiber fabric, and the resin is, the more improved the transparency of plastics substrates or the like produced from the transparent composite composition is. Therefore, the glass filler surface is preferably treated with a surface modifier known in the art, for example a silane coupling agent. More specifically, when a (meth)acrylate(s) having two or more functional groups is(are) used as the reactive monomer(s), acrylic silane compound treatment is preferred.

(Other Ingredients)

In the composite composition of the invention, there may be incorporated, where necessary, a thermoplastic or thermosetting oligomer or polymer may be used combinedly within an addition level range within which the transparency, solvent resistance, heat resistance and other characteristics will not be impaired. In such case, an oligomer or polymer having an alicyclic structure or cardo skeleton is preferably used for the purpose of reducing the water absorbency, for instance. When such thermoplastic or thermosetting oligomer or polymer is combinedly used, the composition of the mixture is to be adjusted so that the refractive index of the whole may match with the refractive index of the glass filler.

In the composite composition of the invention for producing plastics substrates and the like, there may further be incorporated, according to need, an antioxidant, an ultraviolet absorber, a dye or pigment, a loading material such as another inorganic filler, and/or a further additive, each in a small amount so that such characteristics as transparency, solvent resistance and heat resistance may not be impaired.

(Manufacturing Method)

The method of molding the composite composition is not restricted. When a reactive monomer composition is used as the transparent resin, for instance, it includes, among others, (1) the method comprising directly mixing the reactive monomer composition with the glass filler and casting the mixture into a required mold, followed by crosslinking, (2)

the method comprising dissolving the reactive monomer composition in a solvent, dispersing the glass filler in the solution, casting the dispersion, followed by crosslinking, and, further, (3) the method comprising impregnating the glass fiber cloth with the reactive monomer composition, crosslinking the monomer composition and subjecting the whole to sheet formation according to need.

Available for crosslinking the above reactive monomer composition are the method comprising causing curing by means of actinic radiation, the method comprising causing thermal polymerization by heating, and so forth. These methods may be used in combination. When the reactive monomer composition comprises a (meth)acrylate monomer having two or more functional groups, preferably two or more such monomers differing in refractive index, the method comprising causing crosslinking by actinic radiation is preferred. For the purpose of driving the reaction to completion, lowering the retardation value and/or lowering the coefficient of linear expansion, for instance, it is preferred that the step of curing by means of actinic radiation and/or thermal polymerization by means of application of heat be followed by further high temperature heat treatment employed in combination. Ultraviolet light is preferred as the actinic radiation to be used. As the source of ultraviolet light, there may be mentioned, for example, metal halide lamps, high-pressure mercury lamps, and the like.

(Polymerization Initiator)

In crosslinking/curing the reactive monomer composition by actinic irradiation, for example by ultraviolet irradiation, a radical-generating photopolymerization initiator is preferably added to the resin composition. As such photopolymerization initiator, there may be mentioned, for example, benzophenone, benzoin methyl ether, benzoin propyl ether, diethoxyacetophenone, 1-hydroxycyclohexyl phenyl ketone, 2,6-dimethylbenzoyldiphenylphosphine oxide, 2,4,6-trimethylbenzoyldiphenylphosphine oxide, etc. Two or more of these photopolymerization initiators may be used combinedly.

The content of the photopolymerization initiator in the composite composition may be such that an adequate level of curing can be secured. It is preferably 0.01 to 2 parts by weight, more preferably 0.02 to 1 part by weight, most preferably 0.1 to 0.5 part by weight, per 100 parts by weight of the sum of the (meth)acrylates having two or more functional groups. When the level of addition of the photopolymerization initiator is excessive, the polymerization will progresses abruptly, causing such problems as increased birefringence, discoloration, and cracking upon curing. When it is too low, the composition cannot be cured to a sufficient extent and problems may arise, for example the composition after curing may remain sticking to the mold, making it difficult to release the same from the mold.

When high temperature heat treatment is carried out after crosslinking by actinic radiation curing and/or thermal polymerization, it is preferred that a step of 1 to 24 hours of heat treatment at 250–300° C. in a nitrogen atmosphere or under vacuum be carried out additionally in the process of the heat treatment for the purpose of reducing the coefficient of linear expansion, for instance.

In cases where the transparent composite composition of the invention is used in the field of optical applications, namely for producing/preparing transparent sheets, optical lenses, plastics substrates for liquid crystal display devices, color filter substrates, plastics substrates for organic EL display devices, solar cell substrates, touch panels, optical devices, optical waveguides, LED sealing materials, it is preferred that these products have an average coefficient of linear expansion, at 30–150° C., of not more than 50 ppm, more preferably not more than 40 ppm. In particular, when the transparent composite composition is used in sheet form in producing active matrix type display device substrates, the average coefficient of linear expansion is preferably not more than 30 ppm, more preferably not more than 20 ppm. When the coefficient exceeds the above value, such problems as warping and aluminum wiring breakage may possibly occur in the production process. When the coefficient of linear expansion does not exceed the above value, the TFT formation steps can be carried out without substantial modification of the existing equipment for the conventional glass substrates.

In cases where the transparent composite composition of the invention is used for the production of plastics substrates for liquid crystal display devices, color filter substrates, plastics substrates for organic LE display devices, solar panel substrates, touch panels and the like, the substrate thickness is preferably 50 to 2,000 μm, more preferably 50 to 1,000 μm. When the substrate thickness in within this range, the substrates are excellent in flatness and can be lightweight as compared with the corresponding glass substrates.

When the composite composition of the invention is used as optical sheets, the sheets may be provided with a coat layer made of a resin on both sides for improvement in smoothness. The coat resin is preferably one having good transparency, heat resistance and chemical resistance, specifically a polyfunctional acrylate or epoxy resin, for instance. The coat layer preferably has a thickness of 0.1 to 50 μm, more preferably 0.5 to 30 μm.

When such optical sheets of the invention are used as plastics substrates for display devices, a gas barrier layer against water vapor and oxygen and/or a transparent electrode layer may be provided thereon according to need.

EXAMPLES

The following examples illustrate the present invention in more detail. They are, however, by no means limitative of the scope of the invention.

Example 1

A glass cloth made of E glass (thickness 50 μm, refractive index 1.560, Unitika Glass fiber E06B (#1080)) was deprived of organic matter by burning and then treated with acryloyloxypropyltriethoxysilane (acrylic silane compound). This glass cloth was impregnated with a resin composition (refractive index after crosslinking 1.560) composed of 58 parts by weight of dicyclopentadienyl diacrylate (formula 1) (M-203, product of Toagosei Co., Ltd.), 42 parts by weight of bis[4-(acryloyloxyethoxy)phenyl] sulfide (formula 3) (TO-2066, trial product of Toagosei, refractive index after crosslinking 1.606) and 0.5 part by weight of a photopolymerization initiator (1-hydroxycyclohexyl phenyl ketone, Irgacure 184, product of Ciba Specialty Chemicals), followed by degassing. The cloth obtained was subjected to lamination in the manner of resin/cloth/resin/cloth/resin, and the laminate was sandwiched between release agent-treated glass sheets and irradiated from both sides with UV rays at about 500 mJ/cm$^2$ for curing. The laminate was then heated, in a vacuum oven, at about 100° C. for 3 hours and, further, at about 250° C. for 3 hours to give a sheet-like plastic substrate (thickness 0.2 mm). The glass filler content of the substrate was 30% by weight.

Example 2

The same glass cloth as used in Example 1 was impregnated with a resin composition (refractive index after crosslinking 1.560) prepared from 53 parts by weight of norbornanedimethylol diacrylate (formula 2) (trial product of Toagosei, refractive index after crosslinking 1.520), 47 parts by weight of bis[4-(acryloyloxyethoxy)phenyl]sulfide (formula 3) (TO-2066, trial product of Toagosei, refractive index after crosslinking 1.606) and 0.5 part by weight of the photopolymerization initiator, followed by degassing. This glass cloth was subjected to lamination and the laminate subjected to UV light irradiation and heating treatment in the same manner as in Example 1 to give a sheet-like plastic substrate (thickness 0.2 mm). The glass filler content of the substrate was 30% by weight.

Example 3

An E glass-based glass cloth (thickness 100 μm, refractive index 1.560, Unitika Glass fiber E10A (#2117)) deprived of organic matter by burning and treated with acryloyloxypropyltriethoxysilane (acrylic silane compound) was used as the glass cloth. This cloth was impregnated with the same resin composition as used in Example 1, followed by degassing. This glass cloth was sandwiched between release agent-treated glass sheets and irradiated from both sides with UV rays at about 500 mJ/cm$^2$ for curing. The subsequent 3 hours of heating at about 100° C. and further 3 hours of heating at about 250° C. in a vacuum oven gave a sheet-like plastic substrate with a thickness of 0.1 mm. The glass filler content of the substrate was 50% by weight.

Example 4

An E glass-based glass cloth having a thickness of 100 μm and treated in the same manner as in Example 3 was prepared as the glass cloth. This glass cloth was impregnated with the same resin composition as used in Example 2, followed by degassing. This glass cloth was sandwiched between glass sheets, cured by UV light irradiation and heated in the same manner as in Example 3 to give a plastic substrate (thickness 0.1 mm). The glass filler content of the substrate was 50% by weight.

Example 5

An S glass-based glass cloth (thickness 100 μm, refractive index 1.530, product of Unitika Glass fiber (#2117 type) was used as the glass cloth and treated in the same manner as in Example 1. A resin composition (refractive index after crosslinking 1.533) composed of 92 parts by weight of dicyclopentadienyl diacrylate (formula 1) (M-203, product of Toagosei, refractive index after crosslinking 1.527), 8 parts by weight of bis[4-(acryloyloxyethoxy)phenyl] sulfide (formula 3) (TO-2066, trail product of Toagosei, refractive index after crosliniking 1.606) and 0.5 part by weight of the photopolymerization initiator was used as the resin composition. The glass cloth was impregnated with the resin composition and, after degassing, sandwiched between release agent-treated glass sheets and irradiated from both sides with UV rays at about 10 J/cm$^2$ for curing. The subsequent 3 hours of heating at 250° C. in a vacuum oven gave a sheet-like plastic substrate (thickness 0.1 mm). The glass filler content of the substrate was 50% by weight.

Example 6

A resin composition (refractive index after crosslinking 1.531) composed of 96 parts by weight of dicyclopentadienyl diacrylate (formula 1) (M-203, product of Toagosei, refractive index 1.527), 4 parts by weight of bis[4-(acryloyloxyethoxy)phenyl]fluorene (formula 4) (TO-2065, trial product of Toagosei, refractive index after crosslinking 1.624) and 0.5 part of the photopolymerization initiator was prepared as the resin composition. The S glass-based glass cloth prepared in the same manner as in Example 5 was impregnated with this resin composition, followed by degassing. The glass cloth thus obtained was sandwiched between release agent-treated glass sheets and cured by UV light irradiation and heat treatment under the same conditions as in Example 5 to give a sheet-like plastics substrate (thickness 0.1 mm). The glass filler content of the substrate was 50% by weight.

Example 7

A 50-μm-thick T glass-based glass cloth (product of Nittobo, refractive index 1.530) deprived of organic matter by burning and treated with acryloyloxypropyltriethoxysilane (acrylic silane compound) was prepared as the glass cloth. This glass cloth was impregnated with the same resin composition as used in Example 6, followed by degassing. Two sheets of this glass cloth, one on the other, were sandwiched between release agent-treated glass sheets and irradiated with UV rays and heat-treated for curing under the same conditions as in Example 5 to give a sheet-like plastic substrate (thickness 0.1 mm).

The glass filler content of the substrate was 50% by weight.

Example 8

An NE glass-based cloth (thickness 100 μm, refractive index 1.510, product of Nittobo (#2116 type)) was used as the glass cloth and treated in the same manner as in Example 1. The resin composition used (refractive index after crosslinking 1.512) was composed of 90 parts by weight of norbornanedimethylol diacrylate (formula 2) (trial product of Toagosei, refractive index after crosslinking 1.520), 10 parts by weight of hydroxypivalaldehyde-trimethylolpropane acetal diacrylate (formula 6) (Kayarad R-604, Product of Nippon Kayaku, refractive index after crosslinking 1.496) and 0.5 part by weight of the photo-polymerization initiator. The above glass cloth was impregnated with the resin composition and, after degassing, sandwiched between release agent-treated glass sheets, followed by UV light irradiation, curing and heating treatment under the same conditions as in Example 5. A sheet-like plastic substrate (thickness 0.1 mm) was thus obtained. The glass filler content of the substrate was 50% by weight.

Comparative Example 1

The photopolymerization initiator (0.5 part by weight) was added to 100 parts by weight of dicyclopentadienyl diacrylate (formula 1) (M-203, product of Toagosei, refractive index after crosslinking 1.527), and the mixture was sandwiched between release agent-treated glass sheets and irradiated from both sides with UV rays at about 500 mJ/cm$^2$. Further, in a vacuum oven, it was heated at about 100° C. for 3 hours and then at about 250° C. for 3 hours to give a sheet-like plastic substrate (0.2 mm).

Comparative Example 2

A glass cloth made of E glass (thickness 50 µm, refractive index 1.560, Unitika Glass fiber E06B (#1080)) was deprived of organic matter by burning and then treated with acryloyloxypropyltriethoxysilane (acrylic silane compound). This glass cloth was impregnated with a resin composition prepared by adding 0.5 part by weight of the photopolymerization initiator to 100 parts by weight of dicyclopentadienyl diacrylate (M-203, product of Toagosei Co., refractive index after crosslinking 1.527), followed by degassing. The cloth obtained was subjected to lamination in the manner of resin/cloth/resin/cloth/resin, and the laminate was sandwiched between release agent-treated glass sheets and irradiated from both sides with UV rays at about 500 mJ/cm$^2$ for curing. The laminate was then heated, in a vacuum oven, at about 100° C. for 3 hours and, further, at about 250° C. for 3 hours to give a sheet-like plastic substrate (thickness 0.2 mm). The glass filler content of the substrate was 30% by weight.

Comparative Example 3

An E glass-based glass cloth (thickness 100 µm, refractive index 1.560, Unitika Glass fiber E10A (#2117)) was deprived of organic matter by burning and treated with acryloyloxypropyltriethoxysilane (acrylic silane compound). This cloth was impregnated with a resin composition composed of 100 parts by weight of the above-mentioned dicyclopentadienyl diacrylate and 0.5 part by weight of the photopolymerization initiator, followed by degassing. This glass cloth was sandwiched between release agent-treated glass sheets and irradiated from both sides with UV rays at about 500 mJ/cm$^2$ for curing. The subsequent 3 hours of heating at about 100° C. and further 3 hours of heating at about 250° C. in a vacuum oven gave a sheet-like plastic substrate (thickness 0.1 mm). The glass filler content of the substrate was 50% by weight.

(Methods of Evaluation)

The sheet-like plastic substrates (optical sheets) produced in the above examples and comparative examples were measured for various characteristics by the following evaluation methods.

(a) Average Linear Expansion Coefficient

The coefficient was determined by carrying out measurements in a nitrogen atmosphere using a Seiko instruments model TMA/SS120C thermal stress strain measuring apparatus within the range of 30° C. to 150° C. while raising the temperature at a rate of 5° C. per minute after once raising the temperature from 30° C. to 250° C. at a rate of 5° C. per minute and then cooled to 0° C.

For the measurements, originally designed tension chucks (material: quartz, coefficient of linear expansion 0.5 ppm) were used. The Inconel-made chucks in general use have problems, namely they are themselves high in coefficient of linear expansion and unsatisfactory with respect to the mode of supporting samples and, thus, when they are applied to sheets having a thickness exceeding 100 µm, greater linear expansion coefficient values are obtained as compared with the results of measurement in the compression mode and the variation becomes greater. Therefore, the quartz-made tension chucks were originally designed and used in linear expansion coefficient measurements. It has been confirmed that when these tension chucks are used, almost the same values can be measured as in the compression mode.

(b) Heat Resistance (Tg)

Measurements were made on a Seiko instruments model DMS-210 viscoelasticity measuring apparatus. The maximum value of tan δ at 1 Hz was recorded as the glass transition temperature (Tg).

(c) Solvent Resistance

Each specimen was immersed in dimethyl sulfoxide (DMSO) at 60° C. and allowed to stand therein for 60 minutes. After taking out the specimen, its appearance was checked by visual observation. When the shape and color were fully retained and there was no erosion, the appearance was evaluated as ○; otherwise, it was evaluated as X.

(d) Alignment Material Resistance

Each specimen was placed on a spin coater. CRD-8201 (product of Sumitomo Bakelite) was dropped onto the surface thereof, and spin coating was carried out at 2,500 rpm. After 60 minutes of drying at 180° C., the appearance was evaluated by visual observation.

(e) Liquid Crystal Resistance

On drop of Merck's ZIL-4792 was dropped onto the surface of each substrate specimen. The whole was placed in an oven at 80° C. and allowed to stand there for 60 minutes. After taking out the specimen, its appearance was evaluated by visual observation.

(f) Light Transmissivity

Light transmissions at 400 nm and 550 nm were measured on a spectrophotometer U3200 (product of Hitachi Ltd.).

(g) Refractive Index

The refractive index at the wavelength 589 nm was measured at 25° C. using an Atago model DR-M2 Abbe refractometer.

(h) Evaluation of Deformation such as Warping and/or Flexure

A 3,000 Å-thick aluminum layer was formed on each substrate specimen by sputtering, a pseudo wiring pattern, 100 µm wide and 30 mm long, was formed by photolithography, and a 2,000 Å-thick gold layer was formed on each 5-mm end portion of the pattern by sputtering to form 5-mm$^2$ electrodes for resistance value measurement. Then, a metal mask having an opening of 10 mm$^2$ was disposed in the middle of the wiring pattern, and SiN (2,000 Å)/amorphous Si (500 Å)/SiN (2,000 Å) layers were formed by continuous CVD. Further, the whole was placed in an oven at 180° C. and, after 1 hour, allowed to cool to ordinary temperature, and the appearance was checked by visual observation.

The results of the evaluations of the samples obtained in the above-mentioned examples and comparative examples by these evaluation methods are shown below in Tables 1 to 3.

TABLE 1

|  | Example 1 | Example 2 | Example 3 | Example 4 |
|---|---|---|---|---|
| Alicyclic acrylate (formula 1) | 58 | — | 58 | — |
| Alicyclic acrylate (formula 2) | — | 53 | — | 53 |
| Sulfur-containing acrylate (formula 3) | 42 | 47 | 42 | 47 |
| Fluorene acrylate (formula 4) | — | — | — | — |

TABLE 1-continued

|  | Example 1 | Example 2 | Example 3 | Example 4 |
| --- | --- | --- | --- | --- |
| Photopolymerization initiator | 0.5 | 0.5 | 0.5 | 0.5 |
| E glass-based glass cloth | 50 μm × 2 sheets | 50 μm × 2 sheets | 100 μm × 1 sheet | 100 μm × 1 sheet |
| Refractive index of resin | 1.560 | 1.560 | 1.560 | 1.560 |
| Refractive index of glass cloth | 1.560 | 1.560 | 1.560 | 1.560 |
| Substrate thickness (μm) | 200 | 200 | 100 | 100 |
| Average linear expansion coefficient (ppm) | 20 | 19 | 16 | 17 |
| Heat resistance: Tg (° C.) | 210 | 215 | 210 | 215 |
| Alignment material resistance | ○ | ○ | ○ | ○ |
| Liquid crystal resistance | ○ | ○ | ○ | ○ |
| Solvent resistance | ○ | ○ | ○ | ○ |
| Light transimissivity (%) 400 nm | 67 | 65 | 70 | 68 |
| Light transimissivity (%) 550 nm | 87 | 88 | 89 | 89 |
| Warping/flexure | ○ | ○ | ○ | ○ |

TABLE 2

|  | Example 5 | Example 6 | Example 7 | Example 8 |
| --- | --- | --- | --- | --- |
| Alicyclic acrylate (formula 1) | 92 | 96 | 96 | — |
| Alicyclic acrylate (formula 2) | — | — | — | 90 |
| Sulfur-containing acrylate (formula 3) | 8 | — | — | — |
| Fluorene acrylate (formula 4) | — | 4 | 4 | — |
| Cyclic ether acrylate (formula 6) | — | — | — | 10 |
| Photopolymerization initiator | 0.5 | 0.5 | 0.5 | 0.5 |
| S glass-based glass cloth | 100 μm × 1 sheet | 100 μm × 1 sheet | — | — |
| T glass-based glass cloth | — | — | 50 μm × 2 sheets | — |
| NE glass-based glass cloth | — | — | — | 100 μm × 1 sheet |
| Refractive index of resin | 1.533 | 1.531 | 1.531 | 1.512 |
| Refractive index of glass cloth | 1.530 | 1.530 | 1.530 | 1.510 |
| Substrate thickness (μm) | 100 | 100 | 100 | 100 |
| Average linear expansion coefficient (ppm) | 11 | 10 | 10 | 13 |
| Heat resistance: Tg (° C.) | >250 | >250 | >250 | >250 |
| Solvent resistance | ○ | ○ | ○ | ○ |
| Alignment material resistance | ○ | ○ | ○ | ○ |
| Liquid crystal resistance | ○ | ○ | ○ | ○ |
| Light transimissivity (%) 400 nm | 85 | 88 | 88 | 88 |
| Light transimissivity (%) 550 nm | 89 | 89 | 89 | 89 |
| Warping/flexure | ○ | ○ | ○ | ○ |

TABLE 3

|  | Comparative Example 1 | Comparative Example 2 | Comparative Example 3 |
| --- | --- | --- | --- |
| Alicyclic acrylate (formula 1) | 100 | 100 | 100 |
| Alicyclic acrylate (formula 2) | — | — | — |
| Sulfur-containing acrylate (formula 3) | — | — | — |
| Fluorene acrylate (formula 4) | — | — | — |
| Photopolymerization initiator | 0.5 | 0.5 | 0.5 |
| E glass-based glass cloth | — | 50 μm × 2 sheets | 100 μm × 1 sheet |
| Refractive index of resin | 1.527 | 1.527 | 1.527 |
| Refractive index of glass cloth | — | 1.560 | 1.560 |
| Substrate thickness (μm) | 200 | 200 | 100 |
| Average linear expansion coefficient (ppm) | 72 | 19 | 16 |
| Heat resistance: Tg (° C.) | 250 | 250 | 250 |
| Solvent resistance | ○ | ○ | ○ |
| Alignment material resistance | ○ | ○ | ○ |
| Liquid crystal resistance | ○ | ○ | ○ |
| Light transimissivity (%) 400 nm | 88 | 6 | 10 |
| Light transimissivity (%) 550 nm | 90 | 25 | 35 |
| Warping/flexure | X | ○ | ○ |

INDUSTRIAL APPLICABILITY

The transparent composite composition of the invention has a low coefficient of linear expansion and is excellent in transparency, heat resistance and solvent resistance, among others and, therefore, can be utilized, for example, in the form of transparent sheets, optical lenses, plastics substrates for liquid crystal display devices, color filter substrates, plastics substrates for organic EL display devices, solar cell substrates, touch panels, optical devices, optical waveguides, LED sealing materials and so forth, preferably in the form of optical sheets for use as active matrix type liquid crystal display device substrates and organic EL display device substrates, in particular.

The invention claimed is:

1. A transparent composite sheet having a thickness of 50 to 2,000 μm which comprises a transparent resin (a) and a glass fiber cloth as a glass filler (b),
    wherein said transparent resin (a) being a copolymer obtained from
        a first at least one reactive monomer, wherein a homopolymer formed by said first at least one reactive monomer has a lower refractive index after crosslinking than the glass filler (b), and
        a second at least one reactive monomer, wherein a homopolymer formed by said second at least one reactive monomer has a higher refractive index after crosslinking than the glass filler (b), by impregnating the glass fiber cloth with the reactive monomer composition followed by crosslinking using actinic irradiation and/or heating, and
    wherein at least one of the reactive monomers is a (meth)acrylate having two or more functional groups.

2. The transparent composite sheet according to claim 1, wherein the transparent resin (a) has a glass transition temperature of not lower than 150° C.

3. The transparent composite sheet according to claim 1, wherein the difference in refractive index between the transparent resin (a) and glass filler is not more than 0.01.

4. A transparent composite sheet having a thickness of 50 to 2,000 μm which comprises a transparent resin (a) and a glass fiber cloth as a glass filler (b),
    wherein said transparent resin (a) being a copolymer obtained from
        a first at least one reactive monomer, wherein a homopolymer formed by said first at least one reactive monomer has a lower refractive index after crosslinking than the glass filler (b), and
        a second at least one reactive monomer, wherein a homopolymer formed by said second at least one reactive monomer has a higher refractive index after crosslinking than the glass filler (b), by crosslinking using actinic irradiation and/or heating, and
    wherein at least one of the reactive monomers is a (meth)acrylate having two or more functional groups;
    wherein the transparent resin (a) is a copolymer obtained crosslinking an acrylate (a1) having an alicyclic structure and at least one acrylate (a2) selected from among sulfur-containing acrylates and fluorene skeleton-containing acrylates.

5. The transparent composite sheet according to claim 4, wherein the alicyclic structure-containing (meth)acrylate comprises at least one (meth)acrylate selected from among the (meth)acrylates of the following formulas (1) and (2):

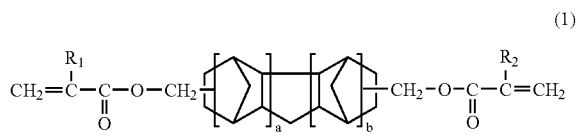

wherein $R_1$ and $R_2$ each independently represents a hydrogen atom or a methyl group, a represents 1 or 2 and b represents 0 or 1;

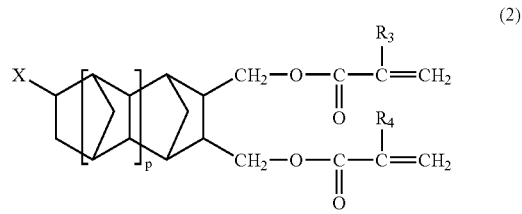

wherein X represents a hydrogen atom, a methyl group, $-CH_2OH$, $-NH_2$, $-CH_2-O-C(=O)-C(CH_3)=CH_2$ or $-CH_2-O-C(=O)-CH=CH_2$, $R_3$ and $R_4$ each independently represents a hydrogen atom or a methyl group and p represents 0 or 1.

6. The transparent composite sheet according to claim 4, wherein the sulfur-containing (meth)acrylate is a (meth)acrylate represented by the following formula (3):

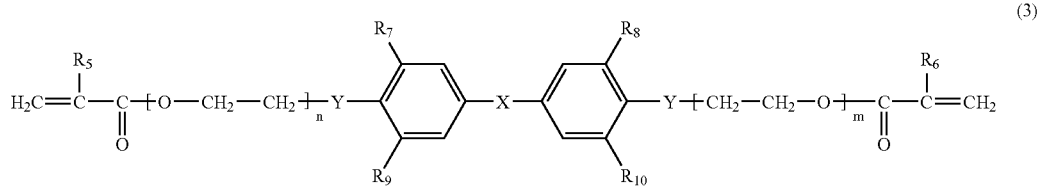

wherein X represents S or $SO_2$, Y represents 0 or 5, $R_5$ to $R_{10}$ each independently represents a hydrogen atom or a methyl group, and n and m each is 0 to 2.

7. The transparent composite sheet according to claim 4, wherein the fluorene skeleton-containing (meth)acrylate comprises at least one (meth)acrylate selected from among the (meth)acrylates of the following formulas (4) and (5):

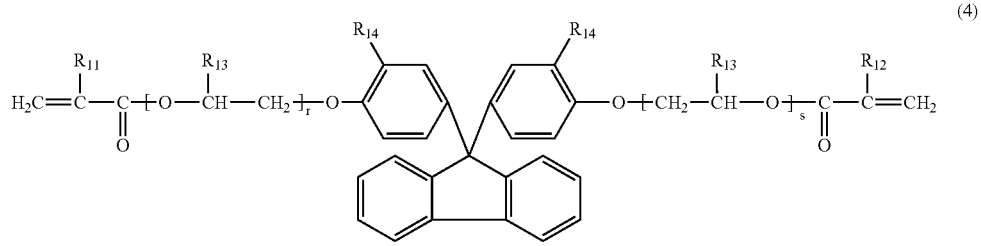

(4)

wherein $R_1$ to $R_{14}$ each independently represents a hydrogen atom or a methyl group and r and s each represents 0 to 2;

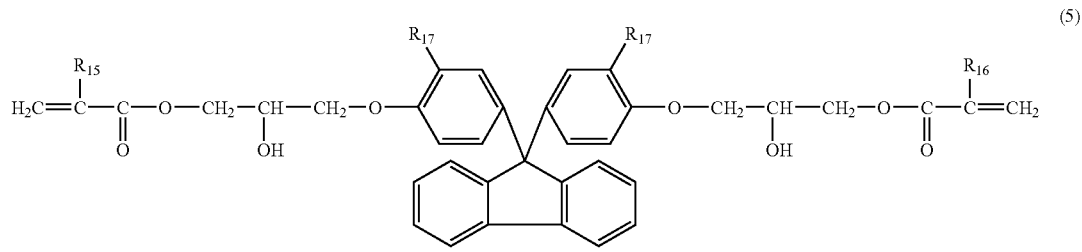

(5)

wherein $R_{15}$ to $R_{17}$ each independently represents a hydrogen atom or a methyl group.

8. The transparent composite sheet according to claim 1, wherein the glass filler (b) has a refractive index of 1.50 to 1.57.

9. The transparent composite sheet according to claim 1, which has an average linear expansion coefficient of not more than 50 ppm within the temperature range of 30 to 150° C.

10. The transparent composite sheet according to claim 1, which occurs as an optical sheet, display device plastic substrate or active matrix type display device substrate.

11. A transparent composite sheet having a thickness of 50 to 2,000 μm which comprises a transparent resin (a) and a glass fiber cloth as a glass filler (b),
wherein said transparent resin (a) has a glass transition temperature of not lower than 150° C. and is a copolymer obtained from
a first at least one reactive monomer, wherein a homopolymer formed by said first at least one reactive monomer has a lower refractive index after crosslinking than the glass filler (b), and
a second at least one reactive monomer, wherein a homopolymer formed by said second at least one reactive monomer has a higher refractive index after crosslinking than the glass filler (b), by impregnating the glass fiber cloth with the reactive monomer composition followed by crosslinking using actinic irradiation and/or heating, and
wherein at least one of the reactive monomers is a (meth)acrylate having two or more functional groups;
wherein the glass filler (b) has a refractive index of 1.50 to 1.57;
the difference in refractive index between the transparent resin (a) and glass filler (b) is not more than 0.01; and
said transparent composite sheet has an average linear expansion coefficient of not more than 50 ppm within the temperature range of 30 to 150° C.

* * * * *